(12) United States Patent
Okuyan et al.

(10) Patent No.: US 9,607,387 B2
(45) Date of Patent: Mar. 28, 2017

(54) SYSTEM AND METHOD FOR OPTIMIZING FIDUCIAL MARKER AND CAMERA POSITIONS/ORIENTATIONS

(71) Applicant: ASELSAN ELEKTRONIK SANAYI VE TICARET ANONIM SIRKETI, Ankara (TR)

(72) Inventors: Erkan Okuyan, Ankara (TR); Ozgur Yilmaz, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 0 days.

(21) Appl. No.: 14/784,030

(22) PCT Filed: Apr. 12, 2013

(86) PCT No.: PCT/IB2013/052922
§ 371 (c)(1),
(2) Date: Oct. 12, 2015

(87) PCT Pub. No.: WO2014/167387
PCT Pub. Date: Oct. 16, 2014

(65) Prior Publication Data
US 2016/0063708 A1    Mar. 3, 2016

(51) Int. Cl.
*G06K 9/00* (2006.01)
*G06T 7/00* (2017.01)
(Continued)

(52) U.S. Cl.
CPC ............ *G06T 7/0042* (2013.01); *G06T 7/20* (2013.01); *G06T 7/73* (2017.01); *G06T 2200/04* (2013.01);
(Continued)

(58) Field of Classification Search
None
See application file for complete search history.

(56) References Cited

U.S. PATENT DOCUMENTS 7,187,809 B2 * 3/2007 Zhao .................. G06K 9/00214
382/285
2004/0239756 A1    12/2004 Aliaga
(Continued)

FOREIGN PATENT DOCUMENTS

WO    WO2013124706 A1    8/2013

OTHER PUBLICATIONS

Felix G Hamza-Lup et al: "Marker Mapping Techniques for Augmented Reality Visualization", Computer and Info. Sciences, Jan. 1, 2002, pp. 1-5, XP055087314.
(Continued)

*Primary Examiner* — Hadi Akhavannik
(74) *Attorney, Agent, or Firm* — Gokalp Bayramoglu (57) ABSTRACT

A method for optimizing fiducial marker and camera positions/orientations is realized to simulate camera and fiducial positions and pose estimation algorithm to find best possible marker/camera placement comprises the steps of: acquiring mesh data representing possible camera positions and feasible orientation boundaries of cameras on the environment of tracked object; acquiring mesh data representing possible active marker positions and feasible orientation placements of markers on a tracked object; pose data representing possible poses of tracked object under working conditions; initializing the control parameter for camera placement; create initial solution strings for camera placement; solving marker placement problem for the current camera placement; evaluating the quality of the current LED and camera placement taking pose coverage, pose accuracy, number of
(Continued)

placed markers, number of placed camera etc. into account; determining if a stopping criterion is satisfied.

87 Claims, 4 Drawing Sheets

(51) Int. Cl.
  *G06T 7/20* (2017.01)
  *G06T 7/73* (2017.01)
(52) U.S. Cl.
  CPC ............... *G06T 2207/10016* (2013.01); *G06T 2207/30204* (2013.01)

(56) References Cited

U.S. PATENT DOCUMENTS

2006/0188131 A1\* 8/2006 Zhang .................. G06T 7/0044
  382/103
2007/0122001 A1\* 5/2007 Wang ................. G06K 9/00208
  382/103

OTHER PUBLICATIONS

Larry Davis et al: "Methods for Designing Head-Tracking Probes", Proceedings of the Joint Conference on Information Sciences, Jan. 1, 2002, pp. 498-502, XP055087315.

Davis L et al; "A Method for Designing Marker-Based Tracking Probes", Proceedings of the Third IEEE and ACM International Symposium on Mixed and Augmented Reality, Nov. 2, 2004, pp. 120-129, XP010769635.

\* cited by examiner

SYSTEM AND METHOD FOR OPTIMIZING FIDUCIAL MARKER AND CAMERA POSITIONS/ORIENTATIONS

FIELD OF THE INVENTION

The present invention relates to the field of computation and simulation and covers methods to optimize the fiducial marker and camera positions/orientations in optical object tracking systems, by simulating the visibility.

BACKGROUND OF THE INVENTION

It is known that there are methods and models to track a three dimensional object in an environment and compute its position and orientation (pose) with respect to a predetermined coordinate system. These kinds of tracker systems are used for example in aircrafts to determine the orientation of head of the pilot. Once the orientation is acquired with respect to the coordinate system of say the display devices, then it is possible to generate graphics on these accordingly. There are different methods to track an object in the scene using magnetic, mechanical or optical means. Currently, the spatial relations of objects may also be determined using magnetic sensors or laser beams but this invention relates specifically to systems using camera-based (day-tv, thermal, IR, Time of Flight etc.) trackers.

In one of the optical camera-based systems the pilot wears a helmet with patterns (fiducial markers) and at least one tracker camera determines the helmet's position and orientation using geometric calculations based on these patterns. Computing spatial relation between an object having a tracking pattern, and a camera is therefore, well known in the state of the art. Throughout the document, whenever a spatial relation is mentioned, it should be understood that the relation between an entity's predetermined reference system with respect to the other's is meant. Determining the position and orientation of an entity using fiducials is called the pose estimation problem and it can be stated as follows: given a set of N feature correspondences between three dimensional (3D) points of an object and two dimensional (2D) projection of that object onto the image plane, find the rotation and translation of the object with respect to the reference system of the camera. The objective is to find rotation and translation between camera and 3D object so that the object's 3D location and orientation is known. This reference system is generally based on the respective pattern of an object under consideration. Since the position and orientation of the tracker camera with respect to the other coordinate systems is known (or can be calculated or measured) in a tracker system, it is also possible to compute the helmet's spatial relation with the tracker camera's sensor and then with other coordinate systems. In this context, "tracked object" means an object having a tracking pattern (fiducial marker) and being tracked by a tracker system. It may be either a helmet as in a helmet-mounted tracker system or any other object.

The patterns used in camera-based tracker systems are either graphical (generally black and white) patterns (passive marker) tracked by visible light cameras or arrays of light sources (e.g. light emitting diodes or LEDs) (active marker). These light sources can be chosen to be in the infrared range of the electromagnetic spectrum with suitable selection of camera sensor and filter set. Other arrangements are also possible but the most convenient among them is the one with the infrared LEDs since these systems can work under inappropriate lighting conditions. The positions (locations) of these LEDs on the tracked object should be determined mindfully to make sure that a small pose error is attained and pose coverage is high. There are some currently used methods to determine and optimize the positions of fiducial markers. In one of such used methods, number of visible fiducials and their relative angle with respect to the optical sensor is used as a constraint to determine optimal fiducial positions. This method is intended to be used in large areas with fiduciary marks and can not be applied to optimize fiducial locations on a moving tracked object being captured by a stationary camera. In addition, when a helmet mounted tracking system is considered, the motion trend of the pilot should also be considered when calculating the fiducial visibility. Furthermore, the pose estimation parameters used by the pose estimation algorithm are not considered in the current methods, which directly affect the output accuracy of the system. There is another work, where motion trend of the pilot and the pose estimation parameters are used by the pose estimation algorithm. However, this method greedily tries to optimize the system, thus it is expected to be stuck at a local optimum solution instead of finding global optimum solution. Furthermore, this method lacks any mechanism to optimize fiducial orientations, which limits its effectivity.

The current methods are not offering an effective way of simulating a tracker system's camera and fiducial positions to optimize the system's pose estimation accuracy altogether. To provide a solution to this problem, a new methodology should be introduced which uses further steps to determine the fiducial positions on a tracked object and positions of cameras in the tracking environment.

The United States patent document US2004239756, an application in the state of the art, discloses a method which uses number of visible fiducials and their relative angle with respect to the capture device as a constraint to determine optimal fiducial positions and compute error bounded pose.

The international patent application numbered PCT/IB12/050801, another application in the state of the art, discloses a method which uses motion trend of the pilot and the pose estimation parameters to determine optimal fiducial positions and compute error bounded pose.

A publication "Felix G Hamza-Lup ET AL: "Marker Mapping Techniques for Augmented Reality Visualization", COMPUTER AND INFO. SCIENCES, 1 Jan. 2002 (2002-01-01), pages 1-5, XP055087314" discloses two algorithm to distribute markers on complex rigid objects.

SUMMARY OF THE INVENTION

An objective of the present invention is to simulate a tracker system's camera and fiducial positions and pose estimation algorithm parameters to optimize the system.

DETAILED DESCRIPTION OF THE INVENTION

A system and method realized to fulfill the objective of the present invention is illustrated in the accompanying figures.

Figure 1:
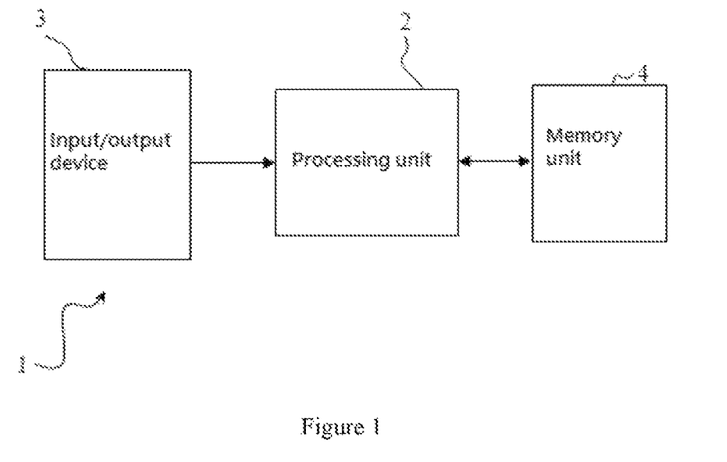
FIG. 1 is the schematic view of the preferred embodiment of the system.
Figure 3:
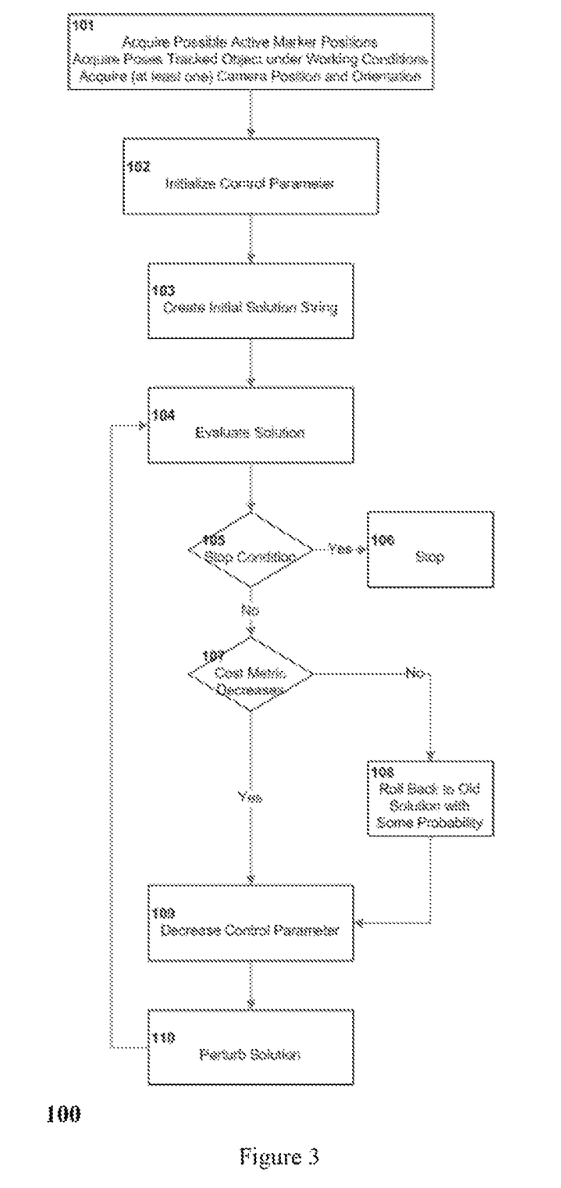
FIG. 3 is the flowchart of the method for optimizing fiducial marker positions and orientations.
Figure 4:
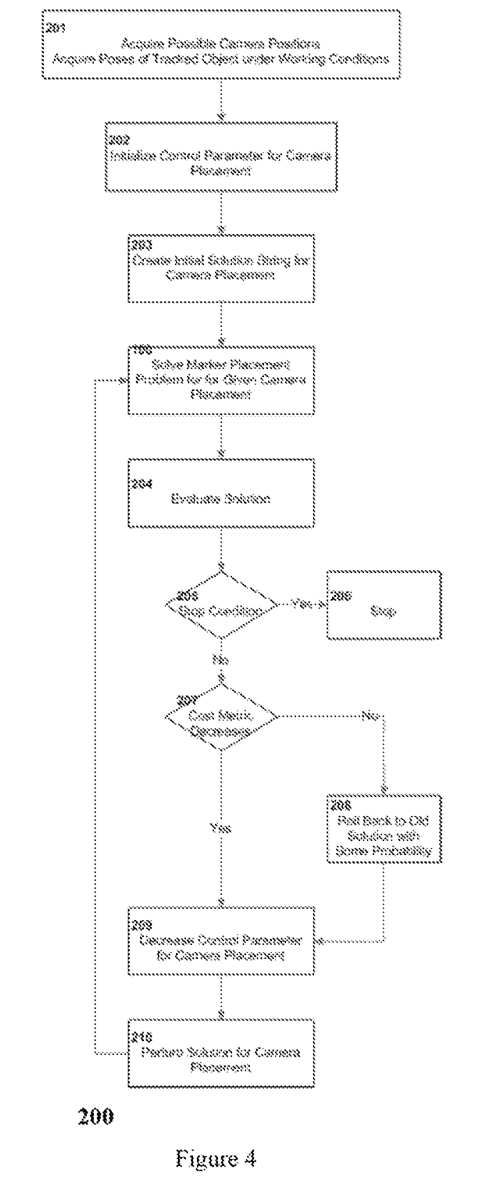
FIG. 4 is the flowchart of the method for optimizing fiducial marker and camera positions/orientations.

The components illustrated in the figures are individually referenced where the numbers and letters refer to the following:
1. System for optimizing tracker system
2. Processing unit
3. Input/output device
4. Memory unit
100. Method for optimizing fiducial marker positions and orientations.
200. Method for optimizing fiducial marker and camera positions/orientations.

Throughout the remaining parts of the specifications, finding the position and orientation of a special object (fiducial marker or camera) in the configuration will be referred to as placement of that special object.

A method for optimizing fiducial marker positions and orientations (100) essentially comprises the steps of,
- acquiring mesh data representing possible active marker positions and feasible orientation boundaries of markers on a tracked object; pose data representing possible poses of tracked object under working conditions; and at least one camera position and orientation (101),
- initializing the control parameter (102),
- creating the initial solution strings (103),
- evaluating the quality of the current LED placement solution taking pose coverage, pose accuracy number of placed markers etc. into account. (104),
- determining if a stopping criterion is satisfied (e.g. are we within acceptable range of desired pose error, pose coverage, number of markers etc. used?) (105),
- if a stopping criterion is satisfied, then outputting the best marker placement solution (106),
- if a stopping criterion is not satisfied, then determining if new solution has smaller cost than previous one (107),
- if the new solution does not have a smaller cost than the previous one, rolling back to previous solution with some probability (which is a function of new cost, old cost and control parameter) (108),
- decreasing the control parameter (109),
- perturbing current solution to create a new solution for evaluation until a stopping criterion is satisfied (perturbation of the solution can be modeled as a series of simple moves on the current solution) (110).

Figure 2:
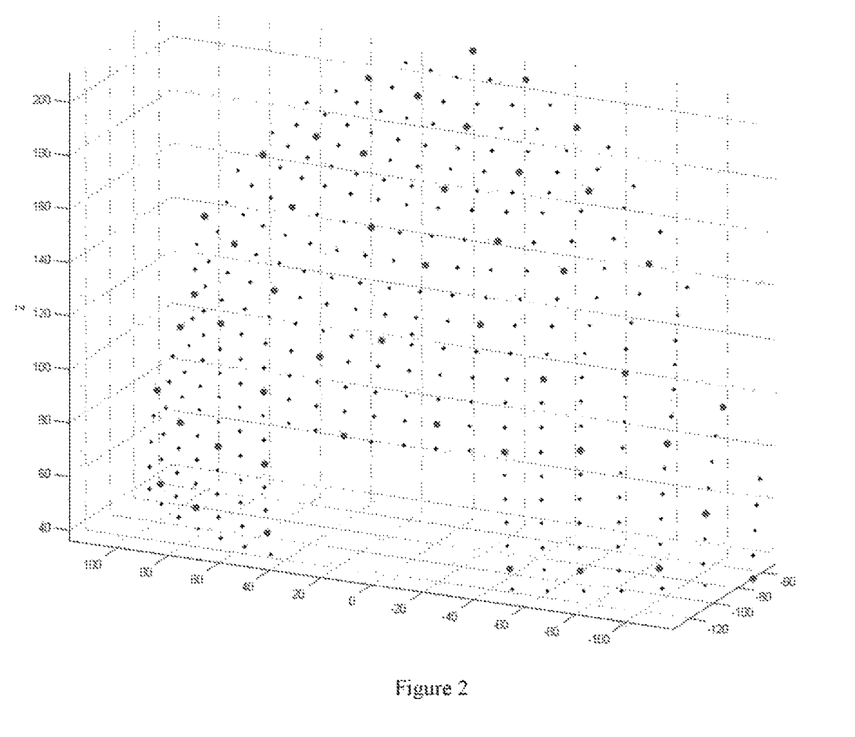
FIG. 2 shows graph of a mesh of possible fiducial positions on the object.

First, the possible positions of active fiducials on the tracked object (say a helmet for a head tracking system with infrared LEDs) are mathematically modeled. To represent a model mathematically, there are various currently known methods and a very basic example can be representing each position on the object with a three dimensional coordinate. It is important to note that these coordinates on the mesh (model) are determined with respect to a common coordinate system and should be relatable to the possible camera locations. Furthermore, because of mechanical constraints for marker placement on tracked objects, feasible orientation of placement of markers should be acquired (this data is direct output of mechanical design). At the same time, pose data representing possible poses of tracked object under working conditions should also be introduced. In a preferred configuration of the present invention, these data are acquired using inertial measurement units (IMU) placed on the real object under real working conditions and movements of the objects are recorded to be used as the pose data. Another option is using an optic based pose estimation setup with many high resolution cameras that is capable of generating accurate and complete pose data and active markers mounted on tracked object This data acquisition system is different from the actual hence is expected to more accurately and completely acquire pose of the object under real working conditions. These data is again discrete and represents many possible poses of the object under various motion scenarios. As indicated, this data should be considered in calculations to effectively simulate real working conditions. As an example, these represent the head motion of a pilot in an aircraft which uses a head tracking system.

Proposed system works in an iterative fashion. At each iteration, system tries to improve a cost function defined by the user (including component cost functions such as fail rate of the system, error of the system with respect to ground truth data and number of hardware components used—each component cost function is explained further in the specifications). Component cost functions are multiplied with user-defined weights and added to find the final function, which system tries to optimize at each iteration. However, optimization is not carried out by the system in a monotonically decreasing manner, such that system sometimes allows the cost to increase in order to converge to a global optimum solution.

Control parameter defines the tendency of proposed system to traverse search space in either a globally optimizing manner or a locally optimizing manner. A higher control parameter value corresponds to an increased global search character of the system. Global optimizing character is needed because during traversal of search space, it is possible that current solution directs to a local minimum, however we need to be able to bypass local optima in order to be able to reach a global optimum. In other words, global search ability of the system gives hill climbing ability (Hill climbing is an analogy for cost minimization, i.e. we accept high cost, top of the hill solution in order to find much lower cost).

A move of the proposed system can be defined as a change in the current placement solution on markers/cameras. Thus a move can be to add a marker/camera to a previously empty position, to remove a marker/camera from a previously occupied position, to change placement orientation of a marker/camera or any combination of the said three moves). A move of the proposed system, which is directed for globally optimizing marker placement may either increase or decrease the quality of the solution. Increasing the quality of the solution is desirable, therefore it is welcome. However, in the case of a decrease in the solution quality, proposed system still may accept the move since this move has the potential to move the current solution from a local optimum direction to the global optima direction. In contrast, a move of the proposed system, which is directed for locally optimizing marker placement, always increases solution quality. At two extremes, a system with full globally optimizing character will act in totally random manner since every move (good or bad cost wise) have potential to go from local optima to global optima, thus all moves are accepted regardless of difference in cost. However, a system with full locally optimizing character will always prefer greedy choices (will only accept moves that will improve solution quality) thus it has very high likelihood to go to local minima depending on initial solution.

At any time, it is not possible to classify the system's character as a fully globally optimizing or fully locally optimizing but the proposed system acts as a probabilistic machine with a combination of global and local optimization characteristics. Control parameter defines relative importance of mentioned characters. Initializing control parameter in step 102 will determine the initial optimization characteristics of the proposed system. The system will be progressively pulled towards locally optimizing; however, initial optimization characteristics greatly affect the output of the system.

Solution to the marker placement problem can be represented by two strings: a bit string and a vector string (both of which have lengths equal to number of possible active marker positions). Bit string is denoted with MPF (Marker Placement Flag) and vector string is denoted with OoM (Orientations of Markers). A set bit (equals 1 or true) in MPF means there is a marker placed in corresponding position on tracked object. Corresponding vector of mentioned bit in the OoM determines the orientation of placement of active marker on tracked object. We call 2-tuple (MPF(i), OoM(i)) formed by combining an element of MPF and its corresponding element in OoM a virtual marker. A virtual marker can be accepted as feasible if it is possible to place an actual marker in the orientation indicated by the OoM.

Strings MPF and OoM are said to be feasible if they satisfy domain specific constraints, one of which is non-maxima suppression on marker positions, and each virtual marker defined by MPF/OoM is feasible. Non-maxima suppression on marker positions means no two placed markers can be closer than some predetermined threshold. Thus initial solution string created should be feasible (i.e. should respect non-maxima suppression constraints and include only feasible virtual markers).

Creation of initial solution strings (MPF, OoM) in step 103 can be done in many ways. One good way to create MPF is to randomly set bits in a manner that respects domain specific constraints (such as non-maxima suppression constraints on marker positions). Another valid approach to create MPF is to use the greedy approach proposed in patent document PCT/IB12/050801. To create OoM, normals to surface of tracked object at corresponding marker position can be used. In any creation in step 103, solution will be improved iteratively (albeit, not with monotonically increasing quality) in later steps.

In step 104, evaluations of MPF and OoM strings takes place. Marker placement optimization is a multi-objective optimization problem. Some possible objectives for this particular problem are minimization of hidden poses (poses that cannot be calculated by tracker system given current marker placement), minimization of pose errors and minimization of number of markers used. Thus, to calculate the quality of a solution, calculation of mentioned metrics is necessary.

When MPF and OoM strings are created/modified, 3D coordinates of the selected nodes (which is called a marker tree) and orientations of markers are passed to optical head tracking algorithm. Markers are projected onto the image plane for each pose as if they are being viewed from each camera in step 104. In addition, these 2D marker images are passed to the pose estimation algorithm that will be used in the simulated system. In the case of LED markers, they are represented as points on the 2D plane and a certain amount noise is added to generate a synthetic LED centroid image in a preferred configuration. Pose estimation algorithm estimates pose for the given marker images (or LED coordinates and centroid image) independently for each pose.

The accuracy and coverage (percent of poses that can be estimated with pose estimation algorithm) of the algorithm for the camera location-marker tree-pose estimation algorithm configuration is tested. Pose error is computed and the poses that the algorithm is unable to compute are accepted as hidden poses. Since the real positions of the markers are known when the input mesh and camera location data is first fed to the simulation they can be used to determine pose error by comparing them with the pose estimation algorithm results (ground truth data).

Quality of a marker placement solution is evaluated as a linear combination of pose error, percent of hidden poses and number of markers used. Since we evaluate the cost of the solution as a weighted combination of several cost functions, increasing/decreasing the weight of a particular objective is possible. Then system will prioritize optimization of heavily weighted objectives while (relatively) ignoring lightly weighted objectives. User is expected to tune out weights of this linear combination according to the needs of user (according to the importance of objectives). In the end of step 104, a single scalar, which is calculated as a linear combination, is obtained as quality of current marker placement.

In step 105, we determine if system should stop optimizing marker placement. There are two conditions that might stop optimization: First, predetermined number of iterations has been executed: second, current solution satisfies minimum requirements for pose error, percent of hidden poses and number of markers used. If a stop condition is present, we output the best placement solution system has encountered in step 106.

In step 107, we determine if moves performed at step 110 decreases solution cost (i.e. increase pose coverage, reduce pose error and reduce number of markers used). To be able to do this check we need to keep solution quality of previous iteration (we also need to keep MPF and OoM strings to be used in step 108). If we decrease cost with respect to previous iteration we accept the current solution to continue with the next iteration. Thus, we always accept moves that increase solution quality (and decrease solution cost). In the first iteration of the system, since there is no previous solution to compare to, we skip step 107.

Step 108 is executed only when the current solution has worse quality than the previous solution. Then, we probabilistically select to use current solution or roll back to the old one. Probability of going back to the old solution depends on current solution quality, old solution quality and control parameter. User is expected to select a function with these three parameters that performs well. However, the function should satisfy the following two properties: First, probability of going back to old solution should increase if the quality difference between current and old solution is large enough; second, probability of going back to old solution should increase as control parameter decreases. Acceptance of the current solution is essential in this optimization procedure even though there is cost increase, because this feature gives the system ability to climb out local minima. However, assuming very big costs in order to climb out minima is not a good approach, thus we have the first property. On the other hand, system has different characters at different stages of execution (ideally, system has globally optimizing character at earlier stages and locally optimizing character at later stages). Second property ensures probabilistic selection of old solution vs. current solution is performed with respect to current character of the system (accept current solution—even though there is cost increase—if there is globally optimizing character, reject current solution if we are locally optimizing).

In step 109, we decrease the control parameter to transform the system from globally optimizing to locally optimizing characteristic. This transformation is gradual and seemingly continuous. User is expected to find a good function for decreasing this parameter that works well for the system (may decrease control parameter fast and spend more time locally optimizing or vise versa).

In step 110, we perturb the current solution to find a new solution to be evaluated in the next iteration. This step is crucial since final output strings will be formed by perturbation in this step. Thus the good design of moves (perturbations) implemented in this step will have profound effect in the result. We should also note that the final perturbation of solution strings would have to obey domain specific constraints (e.g. non-maxima suppression) since final output will be created by step 110.

There are three basic moves that can be used in step (110). Other complex moves may be used: however, complex moves are always composed of the basic three moves. Three basic moves are: Setting a bit position in MPF, clearing a bit position in MPF and changing the direction of a vector in OoM. First move corresponds to placing a marker at a previously unused location, second move corresponds to removing a marker from a previously used location and third move corresponds to changing the orientation of a marker (on the tracked object). Each move has ability to improve the quality of the solution. Adding an extra marker has the ability to cover previously hidden poses and has the ability to improve pose error. Deleting an existing marker decreases number of markers used thus improve placement quality. Also deleting a marker increases the ability (flexibility) to put new markers at different positions (because of domain specific design constraints such as non-maxima suppression on marker positions). Changing placement orientation of an already existing marker has the ability to cover important hidden poses and improve pose error achieved by tracking routine.

One or more of these moves are applied to current solution to find a new solution. In the preferred embodiment, a predetermined (or variable) number of moves are performed in total random manner. This is necessary since heuristics applied in this step may direct solution to a local optima, while random moves have ability pull solution to global optimum direction. In addition to random moves, we can design heuristic moves to improve solution quality and guide perturbations in the right direction.

For setting bits in MPF (adding markers) in one of the preferred embodiments, we can use number of hidden poses covered by added marker as a gain metric. We define a hidden pose as covered if the added marker can be seen by the cameras by the hidden pose. We should increase the probability of adding a marker if it helps eliminating hidden poses. In another embodiment, we can use estimated pose error gain as a gain metric. It is clear that in this embodiment, without evaluating poses with current marker placement, we cannot find pose error. However, we can use the previously evaluated pose errors to identify high error poses. Then, if added marker covers high error poses (added marker can be seen by the cameras for high error poses) it is likely that added marker will help improve pose error (thus solution quality). In yet another embodiment, we can use the number of suppressed marker positions by using the added marker as a cost metric (if there are unused marker spaces within non-maxima suppression threshold, we will not be able to use them; this is a loss to flexibility and can be used for directing perturbation). Further heuristic moves, which are specific to tracker routine, can be suggested. Suggested configuration metrics (cost and gain) defined above can be combined (weighted combination) and used to select moves to be carried out on MPF.

For clearing bits in MPF (deleting markers) in one of the embodiments, we can use the number of hidden poses created by a deleted marker as a cost metric. We can calculate this by keeping track of how many markers can be seen from each pose. Then, if elimination of a marker causes a pose to cover less than a predetermined threshold, we say that elimination of the marker creates the hidden pose (theoretical minimum for the predetermined threshold is 4 given markers are non-coplanar, for practical purposes threshold bigger than 4 can be used). We should decrease the probability of deleting a marker if it causes larger number of hidden poses. In another embodiment, we can use the estimated pose error increase as a cost metric. It is clear that in this embodiment, without evaluating poses with current marker placement, we cannot find pose error. However, we can use the previously evaluated pose errors to identify critical error poses (these are high error poses and poses within close proximity of acceptable error—all the poses except low error poses). Then, if deleted marker covers critical error poses (deleted marker can be seen by the cameras for critical error poses) it is likely that deleted marker will increase pose error (thus, solution quality will decrease). In yet another embodiment, we can use the number of previously suppressed marker positions because of a deleted marker as a gain metric (if there are unused marker spaces within non-maxima suppression threshold, we will be able to use them after deletion. This is a gain to flexibility and can be used to direct perturbation). Further heuristic moves, which are specific to tracker routine, can be suggested. Suggested configuration metrics (cost and gain) defined above can be combined (weighted combination) and used to select moves to be carried out on MPF.

Changing orientations in OoM (placing markers with different orientations) may increase/decrease the number of hidden poses and may increase/decrease the pose error. Thus, to evaluate an orientation-changing move, we need to calculate number of hidden poses before and after the move, and estimate pose error before and after the move. Calculation of estimated pose error and number of hidden poses created/eliminated can be done in the same way as described previously. In one embodiment, for orientation-changing moves, we can use number of hidden poses covered (eliminated with the move) minus number of hidden poses created by the move, as a gain metric (we should increase the probability of carrying out this orientation changing move if this move has high gain). In another embodiment, we can use estimated pose error increase as a cost metric. It is clear that in this configuration, without evaluating poses with current marker placement (and orientations of markers), we cannot find pose error. However, we can use the previously evaluated pose errors to identify high error poses and critical error poses. Then we can define a gain metric as: number of high error poses covered with new orientation of marker minus number of critical error poses that missed coverage with new orientation of marker (higher gain metric corresponds to possible decrease in pose error). Covering high error poses can be done by keeping track of markers that are seen with mentioned high error poses. If more markers are visible for high error poses using new orientations of the markers, we say they are covered after orientation change. Missing a critical error pose can be calculated in a similar manner such that, if a critical error pose has fewer markers seen by the cameras with new orientations of markers, we say it is missed. Further heuristic moves, which are specific to tracker routine, can be suggested. Suggested configuration metrics defined above can be combined (weighted combination) and used to select moves to be carried out on OoM.

In step 110, perturbation (thus generation of new solution from the old one) takes place. Perturbations take place in a probabilistic way. Some of these moves are performed totally in random; some of them use heuristics to guide perturbation. Heuristics use gain calculations of a move and system (probabilistically) tend to carry out moves with higher gain. In the preferred embodiment, more than one move takes place in step 110. It is possible to carry out three different types of moves at a single iteration; more than one repetition for each type of move is also possible.

In step 110, it is also possible to prioritize some poses over others. Some poses will be harder to cover than others. Prioritizing these poses over others will help covering them much easily. To achieve this, each pose can have an associated importance metric that is initialized to some predetermined value. This importance metric will be updated at each iteration if certain conditions hold. Then, if this importance metric (for each pose) is taken into account for move selection in step 110, hard poses will be prioritized over others (gain/cost of important poses will be magnified according to its importance metric).

We increment this importance metric for a pose at each iteration, if that pose is still a hidden pose or a high error pose. Furthermore importance metric increment can be directly proportional to iteration count, i.e. if iteration count is 1 increment on importance metric for a hidden pose is x, however if iteration count is 100 increment on importance metric for a hidden pose is 100x. This approach helps the system to differentiate hidden poses (or high error poses) that is created at current iterations than the ones that was hidden many iterations ago. A hidden pose (or high error pose) persistent at last few iterations will have much more importance than a pose which was problematic at earlier stages of execution. In a preferred configuration, hidden poses cause increase in importance metric more than high error poses, since high error poses can still be processed by tracking routine—albeit with high error—whereas hidden poses are more problematic.

A method for optimizing fiducial marker and camera positions/orientations (200) essentially comprises the steps of,
  acquiring mesh data representing possible camera positions and feasible orientation boundaries of cameras on the environment of tracked object; acquiring mesh data representing possible active marker positions and feasible orientation placements of markers on a tracked object; pose data representing possible poses of tracked object under working conditions (201),
  initializing the control parameter for camera placement (202),
  creating the initial solution strings for camera placement (203),
  solving marker placement problem for the current camera placement (100),
  evaluating the quality of the current LED and camera placement taking pose coverage, pose accuracy, number of placed markers, number of placed cameras etc. into account (204),
  determining if a stopping criterion is satisfied (e.g. are we within acceptable range of desired pose error, pose coverage, number of markers, number of camera etc. used?) (205),
  if a stopping criterion is satisfied then outputting the best marker and camera placement solution (206),
  if a stopping criterion is not satisfied then determining if new camera/marker placement solution has smaller cost than previous one (207),
  if the new solution does not have a smaller cost than the previous one, rolling back to previous solution with some probability (which is a function of new cost, old cost and control parameter) (208),
  decreasing control parameter for camera placement (209).
  perturbing current camera placement solution to create a new solution for evaluation (composed of series of basic moves on current solution) (210).

Method for optimizing fiducial marker and camera positions/orientations (200) is similar to method for optimizing fiducial marker positions and orientations (100). In the following paragraphs, we will describe the differences between the two methods.

In the case of an aircraft, the cockpit (or room) that the head tracker will operate is generally known and camera(s) can virtually be located inside the cockpit 3D model with respect to the nominal head position of the person of interest (i.e. pilot). Even though there are mechanical and system related limits on the camera locations, there is a margin that the cameras can be placed. First, the possible positions of cameras in the environment of tracked object are mathematically modeled. We should note that positions of the cameras should be relatable to marker positions on the tracked object. In step 201, the inputs of the optimization procedure of marker placement (100) along with the mesh representing possible camera positions and orientations should be acquired.

The procedure is similar with marker placement optimization regarding control parameter. In step 202, control parameter initialization for camera placement problem takes place.

Solution to camera placement problem can be represented by two strings: a bit string and a vector string (both of which have lengths equal to number of possible active camera positions). Bit string is denoted with CPF (Camera Placement Flag) and vector string is denoted with OoC (Orientations of Cameras). A set bit in CPF means there is a camera placed in corresponding position on the tracking environment. Corresponding vector of the bit in the OoC will determine the orientation of placement of active camera. We call 2-tuple (CPF(i), OoC(i)) formed by combining an element of CPF and its corresponding element in OoC a virtual camera. A virtual camera can be considered feasible if it is possible to place actual camera in the orientation indicated by the OoC.

Feasibility of strings CPF and OoC can be defined similar to MPF and OoM. Creation of initial solution strings (CPF, OoC) in step (203) can be performed in a similar way described in step 103. However, setting up orientations of cameras are a bit different (since using normals to surface may not be beneficial). In this case, camera orientations that points to the nominal pose of tracked object (Design Eye Position) can be used.

A method for optimizing fiducial marker and camera positions/orientations (200) uses the method for optimizing fiducial marker positions and orientations (100) as a sub system (at each iteration (200) a full instance of (100) is executed).

Quality of a marker and camera placement solution is evaluated as a linear combination of cost of pose error, percent of hidden poses and number of markers used and number of cameras used. Since we evaluate the cost of the solution as a weighted combination of several cost functions, increasing/decreasing the weight of a particular objective is possible. Then, system will prioritize optimization of heavily weighted objectives while putting less emphasis on lightly weighted objectives. User is expected to tune out weights of this linear combination according to the needs of user (according to the importance of objectives). In the end of step 204, a single scalar, which is calculated as a linear combination, is obtained as quality of current camera placement and its associated optimized marker placement.

Steps 205 and 206 are very similar to steps 105 and 106 with the difference of added control on number of cameras used (e.g. stop condition holds if we can achieve target hidden pose percentage, target error rate, target number of markers used along with target number of cameras used). Steps 207, 208 and 209 are very similar to steps 107, 108 and 109, former uses control parameter of camera placement method, CPF, OoC, while latter uses control parameter of marker placement method, MPF, OoM.

Step 210 is similar to step 110 in that perturbation of the current solution to find a new solution to be evaluated in the next iteration is carried out, however this time it perturbs CPF and OoC. This step is crucial since final output strings will be formed by perturbation in this step. Thus, good design of perturbations implemented in this step will have profound effect in the result.

There are three basic moves in step 210. Other complex moves may be used; however, complex moves are always composed of the basic three moves. Three moves are: Setting a bit position in CPF, clearing a bit position in CPF and changing the direction of a vector in OoC. First move corresponds to placing a camera at a previously unused location, second move corresponds to removing a camera from a previously used location and third move corresponds to changing the orientation of a camera (on the track environment). Each move has ability to improve the quality of the solution as described earlier.

One or more of these moves are applied to current camera placement solution to find a new camera placement solution. With the same strategy used in step 110, for step 210, in preferred embodiment a predetermined (or variable) number of moves are performed in total random manner. Other than random moves, we can apply some heuristics to improve solution quality and guide perturbations in the right direction.

In regard to heuristics to guide moves of camera (adding a camera, removing a camera and changing orientation of a camera), we will need a marker tree (marker placement with orientations). For method for optimizing fiducial marker and camera positions/orientations (200), this marker tree will be the one found in method for optimizing fiducial marker positions and orientations (100) fed with current camera placement solution. Then with respect to this marker placement configuration, it is possible to calculate gains and costs for camera related moves. Following paragraphs assumes marker placement solution is known for camera placement perturbation (step 210). Given poses, marker tree (with orientations) and old camera positions we can calculate the eliminated number of hidden poses, expected decrease in pose error. Calculation of gain metrics for setting/clearing a bit in CPF and changing orientation in OoC is very similar to its marker counterparts explained above. However, one assumes the camera positions are fixed and changes the marker placement solution while other assumes markers are fixed and changes camera placement solution. Metrics are given below without further explanation declaring that discussion on step 110 on marker placement is also applicable here.

For setting bits of CPF, in one of the preferred configurations we can use number of hidden poses covered by added camera as a gain metric. In another preferred configuration we can use estimated pose error gain as a gain metric. Further heuristic moves, which are specific to tracker routine, can be suggested. In suggested embodiment, metrics (cost and gain) defined above should be combined (weighted combination) and used to select moves to be carried out on CPF.

For clearing bits of CPF, in one of the preferred configurations we can use the number of hidden poses created by removed camera as a cost metric. In another embodiment, we can use estimated pose error increase as a cost metric. Further heuristic moves, which are specific to tracker routine, can be suggested. In an embodiment, metrics (cost and gain) defined above should be combined (weighted combination) and used to select moves to be carried out on CPF.

Changing orientations in OoC (placing cameras with different orientations) may increase/decrease number of hidden poses and may increase/decrease pose error. In one of the embodiments, for orientation changing moves, we can use number of hidden poses covered (eliminated with the move) minus number of hidden poses created, as a gain metric. In another embodiment, we can use estimated pose error increase as a cost metric. We can define this cost metric as number of critical poses that missed coverage with new orientation of camera minus number of critical poses covered with new orientation of camera. Further heuristic moves, which are specific to tracker routine, can be suggested. In suggested embodiment, metrics defined above should be combined (weighted combination) and used to select moves to be carried out on OoC.

In step 210, perturbation (thus generation of new solution from the old one) takes place the same way as in the step 110. Perturbations are performed in a probabilistic manner. Some of these moves are performed totally in random; some of them use heuristics to guide perturbation. Heuristics use gain associated with a move and system (probabilistically) tend to carry out moves with higher gain. In an embodiment, more than one move takes place in step 210. It is possible to carry out three different types of moves at a single iteration; more than one repetition for each type of move is possible.

In step 210 it is also possible to prioritize some poses over others much like it is done in step 110. In a preferred configuration, poses are prioritized over others directly proportional to iteration count (however, prioritization of poses is internal to processes 100 and 200—prioritization within 100 does not affect 200, they are separate processes). In one embodiment, hidden poses cause increase in importance metric more than high error poses, since high error poses can still be processed by tracking routine—albeit with high error—whereas hidden poses are more problematic.

A system for optimizing fiducial maker and camera positions/orientations (1) fundamentally comprises;
  at least one processing unit (2) configured to receive pose, mesh data for markers, mesh data for cameras and implement the method for optimizing fiducial marker and camera positions/orientations (200) using this data; to implement the tracker algorithm for which the system will be optimized and output results found by the method (200),
  at least one input/output device (3) connected to processing unit (2) configured to receive pose, mesh data for markers, mesh data for cameras, from an outside source such as a user; and output results found by processing unit (2),
  at least one memory unit (4) connected to processing unit (2); configured to store, when necessary, the optimization results found by processing unit (2) and any pose, mesh data for markers, mesh data for cameras.

In the preferred embodiment of the present invention, processing unit (2) is configured to receive pose, mesh data for markers, mesh data for cameras from the input/output device (3). Method (200) is applied on a sequence of pose data (representing possible orientations and locations of the tracked object), mesh data for markers (representing the possible LED positions on the tracked object) and mesh data for cameras (representing possible camera positions on tracking environment) for each data set. In another embodiment of the present inventive system (1), processing unit (2) is configured to receive pose, mesh data for markers, mesh data for cameras from the memory unit (4). This way, it is possible to analyze and simulate previously recorded data without the need for new data set acquisition.

Input/output device (3) is preferentially configured to receive at least one pose data of the tracked object under consideration by any known means such as optical/magnetic or laser tracking. This pose data is preferentially relative to a predetermined reference frame which is relative to at least one camera position in the actual tracking system under consideration. In a preferred embodiment, input/output device (3) is preferentially configured to receive at least one pose data of the tracked object under consideration using an inertial measurement unit (IMU) mounted to that object or an optic based high resolution multi camera pose estimation data acquisition system that is capable of generating accurate and complete pose data. By doing this, any possible position and orientation of the tracked object under real operating conditions can be simulated on the processing unit (2) with a much more realistic approach. The mesh data for markers and mesh data for cameras are generated by a user through the input/output device by currently known computer aided modeling tools.

Input/output device (3) therefore, is any interface device known in the art such as monitor, keyboard, mouse, camera or a combination.

Memory unit (4) is any volatile or non-volatile memory device known in the art such as a RAM (random access memory), ROM (read-only memory), flash memory or a hard disk. These are used to store input, output or intermediate data related to the said method (200) temporarily or permanently.

The method (200) together with the system (1) can effectively simulate a tracker system's camera and fiducial positions and pose estimation algorithm parameters to optimize the marker positions and orientations as well as camera positions and orientations.

The invention claimed is:

1. A method for optimizing fiducial marker positions and orientations comprising the steps of:
acquiring a mesh data representing possible an active marker positions and feasible orientation boundaries of markers on a tracked object;
a pose data representing possible poses of tracked object under working conditions;
initializing a control parameter defining a relative importance of a local search with respect to a global search,
creating initial solution strings comprising a bit string to specify the presence of a marker and a vector string to specify an orientation of a marker,
evaluating a quality of a current LED maker placement solution by taking a pose coverage, a pose accuracy a number of placed markers into account a new solution,
determining if a stopping criterion is within a range of desired pose error, a pose coverage, a number of markers,
when the stopping criterion is satisfied, outputting best marker placement solution,
when the stopping criterion is not satisfied, determining whether the new solution has a smaller cost than a previous one,
when the new solution does not have a smaller cost than a solution of the previous iteration, rolling back to the previous solution with some probability, which is a function of a new cost, an old cost and the control parameter,
decreasing the control parameter,
perturbing the current solution to create the new solution for evaluation in the evaluating step until the stopping criterion is satisfied, wherein a perturbation of solution models as a series of simple moves on the current solution.

2. The method for optimizing fiducial marker positions and orientations of claim 1, wherein marker position and A marker orientation optimization is carried out.

3. The method for optimizing fiducial marker positions and orientations of claim 2, wherein a marker position/orientation optimization is carried out both in locally and globally optimum spectrum.

4. The method for optimizing fiducial marker positions and orientations of claim 1, wherein according to a current value of control parameter, a system has both local search and global search character.

5. The method for optimizing fiducial marker positions and orientations of claim 1, wherein initialization of the control parameter defines initial search character of g system in the initializing step.

6. The method for optimizing fiducial marker positions and orientations of claim 1, wherein a solution string (MPF) to marker placement problem is initialized with fidelity to domain specific constraints in the creating step.

7. The method for optimizing fiducial marker positions and orientations of claim 1, wherein a solution string to marker placement problem (OoM) is initialized with fidelity to mechanical constraints in the creating step.

8. The method for optimizing fiducial marker positions and orientations of claim 1, wherein a solution string to marker placement problem (MPF) initialized randomly or using greedy placement methods in the creating step.

9. The method for optimizing fiducial marker positions and orientations claim 1, wherein a solution string to marker placement problem (OoM) initialized using normals to a surface of the tracked object in the creating step.

10. The method for optimizing fiducial marker positions and orientations of claim 1, wherein for a given pose data and marker placement, a quality of current marker placement is evaluated as a weighted linear combination of a number of hidden poses, a pose error and a number of markers used in the evaluating step.

11. The method for optimizing fiducial marker positions and orientations of claim 1, wherein execution of a predetermined number of iterations or achievement of minimum requirements for a pose error, a number of hidden poses and a number of markers used causes a system to terminate in the determining step.

12. The method for optimizing fiducial marker positions and orientations of claim 1, wherein a best placement solution encountered in whole execution is passed to output in the outputting step.

13. The method for optimizing fiducial marker positions and orientations of claim 1, wherein qualities of current and previous marker placement solutions are compared in the comparing step.

14. The method for optimizing fiducial marker positions and orientations of claim 1, wherein the comparing step is not executed in a first iteration.

15. The method for optimizing fiducial marker positions and orientations of claim 1, wherein a solution quality increase in the current solution results in an immediate acceptance of the current solution for later iterations.

16. The method for optimizing fiducial marker positions and orientations of claim 1, wherein a solution quality decrease in the current solution results in a probabilistic acceptance of the current solution for later iterations.

17. The method for optimizing fiducial marker positions and orientations of claim 1, wherein in case of solution quality decrease, an acceptance of the current solution is guided by a function which has following properties in the rolling back step:
   a higher acceptance rate if a quality difference between the previous and the current solution is small,
   a higher acceptance rate if the control parameter hash large value.

18. The method for optimizing fiducial marker positions and orientations of claim 1, wherein a decrease of the control parameter to increase the local search character of a system takes place in the decreasing step.

19. The method for optimizing fiducial marker positions and orientations of claim 1, wherein perturbations on the current solution to find a next solution is carried out in the perturbing step.

20. The method for optimizing fiducial marker positions and orientations of claim 1, wherein perturbations can be composed of three different basic moves: setting a bit position in MPF, clearing a bit position in MPF, changing a direction of a vector in OoM.

21. The method for optimizing fiducial marker positions and orientations of claim 1, wherein perturbations can be composed of three different types of moves at a single iteration; more than one repetitions for each type of move g also possible.

22. The method for optimizing fiducial marker positions and orientations of claim 1, wherein perturbations respects domain specific design rules and mechanical constraints in the perturbing step.

23. The method for optimizing fiducial marker positions and orientations of claim 1, wherein a predetermined or variable number of moves is performed in a total random manner along with heuristic moves to guide the perturbation in the perturbing step.

24. The method for optimizing fiducial marker positions and orientation of claim 1, wherein a heuristic move that zi a bit in MPF is probabilistically selected among candidate moves which are guided by gain and cost metrics in the perturbing step.

25. The method for optimizing fiducial marker positions and orientations of claim 1, wherein a heuristic move that sets a bit in MPF is guided by the gain metric of a number of hidden poses covered by an added marker.

26. The method for optimizing fiducial marker positions and orientations of claim 1, wherein a heuristic move that sets a bit in MPF is guided by the gain metric of a number of high error poses covered by an added marker.

27. The method for optimizing fiducial marker positions and orientations of claim 1, wherein a heuristic move that sets a bit in MPF is guided by the cost metric of a number of suppressed marker positions by an added marker.

28. The method for optimizing fiducial marker positions and orientations of claim 1, wherein a heuristic move that sets a bit in MPF is guided by a weighted linear combination of gain and cost metrics for MPF bit setting in the perturbing step.

29. The method for optimizing fiducial marker positions and orientations of claim 1, wherein a heuristic move that clears a bit in MPF is probabilistically selected among candidate moves which are guided by gain and cost metrics in the perturbing step.

30. The method for optimizing fiducial marker positions and orientations of claim 1, wherein a heuristic move that clears a bit in MPF is guided by the cost metric of a number of hidden poses created by a deleted marker.

31. The method for optimizing fiducial marker positions and orientations of claim 1, wherein a heuristic move that clears a bit in MPF is guided by the cost metric of a number of critical error poses missed coverage because of a deleted marker.

32. The method for optimizing fiducial marker positions and orientations of claim 1, wherein a heuristic move that clears a bit in MPF is guided by the gain metric of a number of previously suppressed marker positions by the deleted marker.

33. The method for optimizing fiducial marker positions and orientations of claim 1, wherein a heuristic move that clear a bit in MPF is guided by a weighted linear combination of gain and cost metrics for MPF bit clearing in the perturbing step.

34. The method for optimizing fiducial marker positions and orientations of claim 1, wherein a heuristic move that changes a orientation of a vector in OoM is probabilistically selected among candidate moves which are guided by gain metrics in the perturbing step.

35. The method for optimizing fiducial marker positions and orientations of claim 1, wherein a heuristic move that changes an orientation of a vector in OoM is guided by the gain metric of a number of hidden poses covered minus a number of hidden poses created with marker orientation changing move.

36. The method for optimizing fiducial marker positions and orientations of claim 1, wherein a heuristic move that changes an orientation of a vector in OoM is guided by the gain metric of a number of high error poses covered minus a number of critical error poses that missed coverage with a marker orientation changing move.

37. The method for optimizing fiducial marker positions and orientations of claim 1, wherein a heuristic move that changes an orientation of a vector in OoM is guided by a weighted linear combination of gain metrics for modifying a vector in OoM in the perturbing step.

38. The method for optimizing fiducial marker positions and orientations of claim 1, wherein each pose has an associated importance metric which is incremented at each iteration when the pose is hidden or high error pose.

39. The method for optimizing fiducial marker positions and orientations of claim 1, wherein a probabilistic move selection is carried out using a pose importance in the perturbing step.

40. The method for optimizing fiducial marker positions and orientations of claim 1, wherein pose importance values are incremented directly proportional to an iteration count of the system.

41. The method for optimizing fiducial marker positions and orientations of claim 1, wherein a condition of being a hidden pose cause larger increments on an associated importance value than a condition of being high error pose.

42. A method for optimizing camera positions and orientations comprising the steps of:

acquiring mesh data representing possible camera positions and feasible orientation boundaries of cameras on an environment of a tracked object;

pose data representing possible poses of a tracked object under working conditions, initializing a control parameter defining relative importance of local search with respect to a global search for a camera placement, creating initial solution strings comprising a bit string to specify a presence of a camera (CPF) and a vector string to specify an orientation of a camera (OoC), evaluating quality of a current LED and a camera placement taking a pose coverage, a pose accuracy, a number of placed cameras into account in a new solution, determining if a stopping criterion is within an acceptable range of desired pose error, a pose coverage, a number of camera, when the stopping criterion is satisfied, then outputting a best marker and a camera placement solution, when the stopping criterion is not satisfied determining whether a new camera placement solution has a smaller cost than a previous one, when the new solution does not have a smaller cost than a solution of the previous iteration, rolling back to the previous solution with some probability, which is a function of a new cost, an old cost and the control parameter, decreasing the control parameter for the camera placement, perturbing the current camera placement solution to create new solution for evaluation in the evaluating step for the camera wherein a perturbation of the solution is composed of series of basic moves on the current camera placement solution.

43. The method for optimizing camera positions and orientations of claim 42, wherein a camera position and a camera orientation optimization is carried out.

44. The method for optimizing positions and orientations of claim 43, wherein a camera position and a orientation optimization is carried out both in locally and globally optimum spectrum.

45. The method for optimizing camera positions and orientations of claim 42, wherein according to a current value of control parameter, a system has both local search and global search character.

46. The method for optimizing camera positions and orientations of claim 42, wherein initialization of the control parameter defines initial search character of system in the initializing step for the camera.

47. The method for optimizing camera positions and orientations of claim 42, wherein a solution string to camera placement problem (OoC) is initialized with fidelity to mechanical constraints in the creating step for the camera.

48. The method for optimizing camera positions and orientations of claim 42, wherein a solution string to camera placement problem (CPF) initialized randomly or using greedy placement methods in the creating step for the camera.

49. The method for optimizing camera positions and orientations of claim 42, wherein a solution string to camera placement problem (OoC) initialized using nominal pose of the tracked object in the creating step for the camera.

50. The method for optimizing camera positions and orientations of claim 42, wherein for a given pose data and camera placement, a quality of current marker/camera placement is evaluated as a weighted linear combination of a number of hidden poses, a pose error, a number of markers used and a number of cameras used in the evaluating step for the camera.

51. The method for optimizing camera positions and orientations of claim 42, wherein an execution of a predetermined number of iterations or achievement of minimum requirements for a pose error, a number of hidden poses, and a number of cameras used causes a system to terminate in the determining step for the camera.

52. The method for optimizing camera positions and orientations of claim 44, wherein a best overall camera solution encountered in whole execution is passed to output in the outputting step for the camera.

53. The method for optimizing camera positions and orientations of claim 42, wherein qualities of current and previous camera placement solutions is compared in the comparing step for the camera.

54. The method for optimizing camera positions and orientations of claim 42, wherein the comparing step for the camera is not executed in first iteration.

55. The method for optimizing camera positions and orientations of claim 42, wherein a solution quality increase in the current camera placement solution results in an immediate acceptance of the current camera placement solution for later iterations.

56. The method for optimizing optimizing camera positions and orientations of claim 42, wherein a solution quality decrease in the current camera placement solution results in a probabilistic acceptance of the current camera placement solution for later iterations.

57. The method for optimizing optimizing camera positions and orientations of claim 42, wherein in case of solution quality decrease, an acceptance of the current camera placement solution is guided by a function which has following properties in the rolling back step for the camera:
  a higher acceptance rate if a quality difference between a previous and the current camera placement solution is small,
  a higher acceptance rate if the control parameter has a large value.

58. The method for optimizing optimizing camera positions and orientations of claim 42, wherein a decrease of the control parameter to increase the local search character of a system takes place in the decreasing step for the camera.

59. The method for optimizing optimizing camera positions and orientations of claim 42, wherein perturbations on a current solution to find next solution is carried out in the perturbing step for the camera.

60. The method for optimizing optimizing camera positions and orientations of claim 42, wherein perturbations can be composed of three different basic moves: setting a bit position in CPF, clearing a bit position in CPF, changing a direction of a vector in OoC.

61. The method for optimizing camera positions and orientations of claim 42, wherein perturbations can be composed of three different types of moves at a single iteration; more than one repetitions for each type of move are also possible.

62. The method for optimizing camera positions and orientations of claim 42, wherein perturbations respects domain specific design rules and mechanical constraints in the perturbing step for the camera.

63. The method for optimizing camera positions and orientations of claim 42, wherein a predetermined (or variable) number of moves is performed in total random manner along with heuristic moves to guide the perturbation in the perturbing step for the camera.

64. The method for optimizing camera positions and orientations of claim 42, wherein g heuristic move that sets a bit in CPF is probabilistically selected among candidate moves which are guided by gain and cost metrics in the perturbing step for the camera.

65. The method for optimizing camera positions and orientations of claim 42, wherein a heuristic move that sets a bit in CPF is guided by the gain metric of a number of hidden poses covered by an added camera.

66. The method for optimizing camera positions and orientations of claim 42, wherein heuristic move that sets a bit in CPF is guided by the gain metric of number of high error poses covered by an added camera.

67. The method for optimizing camera positions and orientations of claim 42, wherein a heuristic move that sets a bit in CPF is guided by a weighted linear combination of gain and cost metrics for CPF bit setting in the perturbing step for the camera.

68. The method for optimizing camera positions and orientations of claim 42, wherein a heuristic move that clears a bit in CPF is probabilistically selected among candidate moves which are guided by gain and cost metrics in the perturbing step for the camera.

69. The method for optimizing camera positions and orientations of claim 42, wherein a heuristic move that clears a bit in CPF is guided by the cost metric of a number of hidden poses created by g deleted camera.

70. The method for optimizing camera positions and orientations of claim 42, wherein a heuristic move that clears a bit in CPF is guided by the cost metric of a number of critical error poses missed coverage because of a deleted camera.

71. The method for optimizing camera positions and orientations of claim 42, wherein a heuristic move that clears a bit in CPF is guided by g weighted linear combination of gain and cost metrics for CPF bit clearing in the perturbing step for the camera.

72. The method for optimizing camera positions and orientations of claim 42, wherein g heuristic move that changes an orientation of a vector in OoC is probabilistically selected among candidate moves which are guided by gain metrics in the perturbing step for the camera.

73. The method for optimizing camera positions and orientations of claim 42, wherein a heuristic move that changes an orientation of a vector in OoC is guided by the gain metric of a number of hidden poses covered minus a number of hidden poses created with a camera orientation changing move.

74. The method for optimizing camera positions and orientations of claim 42, wherein a heuristic move that changes an orientation of a vector in OoC is guided by the gain metric of a number of high error poses covered minus a number of critical error poses that missed coverage with a camera orientation changing move.

75. The method for optimizing camera positions and orientations of claim 42, wherein a heuristic move that changes an orientation of a vector in OoC is guided by a weighted linear combination of gain metrics for modifying a vector in OoC in the perturbing step for the camera.

76. The method for optimizing camera positions and orientations of claim 42, wherein each pose has an associated importance metric which is incremented at each iteration when the pose is hidden or high error pose.

77. The method for optimizing camera positions and orientations of claim 42, wherein a probabilistic move selection is carried out using a pose importance in the perturbing step for the camera.

78. The method for optimizing camera positions and orientations of claim 42, wherein pose importance values are incremented directly proportional to an iteration count of a system.

79. The method for optimizing camera positions and orientations of claim 42, wherein a condition of being a hidden pose cause larger increments on an associated importance value than a condition of being a high error pose.

80. A system for optimizing fiducial marker and camera positions and orientations comprising:
a processing unit configured to receive a pose, a marker mesh and camera mesh data and implement the method for optimizing fiducial marker and camera positions and orientations using this data;
a tracker algorithm for which the system will be optimized and output results found by a method for optimizing camera positions and orientations, the method including the steps of:
acquiring mesh data representing possible camera positions and feasible orientation boundaries of cameras on an environment of a tracked object;
pose data representing possible poses of a tracked object under working conditions, initializing a control parameter defining a relative importance of a local search with respect to a global search for a camera placement,
creating initial solution strings comprising a bit string to specify a presence of a camera (CPF) and a vector string to specify an orientation of a camera (OoC),
evaluating a quality of a current LED and a camera placement taking a pose coverage, a pose accuracy, a number of placed cameras into account in a new solution,
determining if a stopping criterion is within an acceptable range of desired pose error, a pose coverage, a number of camera,
when the stopping criterion is satisfied, outputting a best marker and a camera placement solution,
when the stopping criterion is not satisfied determining whether a new camera placement solution has a smaller cost than a previous one,
when the new solution does not have a smaller cost than a solution of the previous iteration, rolling back to the previous solution with some probability, which is a function of a new cost, an old cost and the control parameter,
decreasing the control parameter for the camera placement,
perturbing the current camera placement solution to create the new solution for evaluation in the evaluating step for the camera wherein a perturbation of the solution is composed of series of basic moves on the current camera placement solution,
an input/output device connected to the processing unit configured to receive the pose, the marker mesh and the camera mesh data, from an outside source such as a user, the input/output device being selected from the group consisting of a monitor, a keyboard, a mouse, a camera or a combination; and
output results found by processing unit, a memory unit connected to the processing unit configured to store, when necessary, optimization results found by the processing unit and any pose, the marker mesh and the camera mesh data.

81. The system for optimizing fiducial marker and camera positions and orientations of claim 80, wherein the processing unit is configured to receive the pose, the marker mesh and the camera mesh data from the input/output device.

82. The system for optimizing fiducial marker and camera positions and orientations of claim 80, wherein the processing unit which is configured to receive the pose, the marker mesh and the camera mesh position data from the memory unit.

83. The system for optimizing fiducial marker and camera positions and orientations of claim 80, wherein the input/output device is configured to receive the pose data of the tracked object under a consideration using an inertial measurement unit (IMU).

84. The system for optimizing fiducial marker and camera positions/orientations of claim 80, wherein the input/output device is configured to receive the pose data of the tracked object under a consideration using an optic based pose data acquisition system with multiple high resolution cameras that is capable of generating accurate and complete pose data.

85. The system for optimizing fiducial marker and camera positions/orientations of claim 80, wherein the input/output device is configured to receive user generated camera position data and the marker and the camera mesh data.

86. The system for optimizing fiducial marker and camera positions/orientations of claim 80, wherein the memory unit is a volatile memory device.

87. The system for optimizing fiducial marker and camera positions/orientations of claim 80, wherein the memory unit is a non-volatile memory device.

\* \* \* \* \*